United States Patent [19]

McLoughlin

[11] 4,178,664
[45] Dec. 18, 1979

[54] ROLLER WITH REPLACEABLE SLEEVE

[76] Inventor: Nelson E. McLoughlin, P.O. Box 47, Newell, N.C. 28126

[21] Appl. No.: 925,037

[22] Filed: Jul. 17, 1978

[51] Int. Cl.$^2$ .............................................. B21B 31/08
[52] U.S. Cl. ...................................................... 29/130
[58] Field of Search ............ 29/116, 124, 125, 129.5, 29/130, 131, 132; 29/148.4 D, 130; 100/155, 157; 198/835; 74/230.7; 193/37

[56] References Cited

U.S. PATENT DOCUMENTS

| 246,870 | 9/1881 | Crichton | 29/130 X |
|---|---|---|---|
| 1,384,806 | 7/1921 | Reed | 29/132 X |
| 1,993,718 | 3/1935 | Miner | 29/132 X |
| 2,312,853 | 3/1943 | Toland et al. | 29/130 X |
| 2,597,858 | 5/1952 | Freedlander | 29/132 X |
| 3,771,206 | 11/1973 | Brown | 29/130 X |

Primary Examiner—Louis Rimrodt

Attorney, Agent, or Firm—Adams & Jenkins

[57] ABSTRACT

A roller having a readily replaceable sleeve so as to allow replacement with a like sleeve and comprising a core with a suitable elastomer layer fixedly secured to the outer peripheral surface thereof and a removable sleeve adapted so as to longitudinally slide onto the core and frictionally engage the outer peripheral surface thereof so as to rotate with the core. The removable sleeve comprises a substantially rigid inner layer for engaging the peripheral outer surface of the elastomer layer of the core and an outer surface layer of a suitable elastomer fixedly secured to the inner layer. The outer surface layer of the core is compressed when engaged by the removable sleeve and imparts a compressive force to the inner surface area of the rigid inner layer thereof so as to maintain the core and the replaceable sleeve in concentric relationship to each other.

3 Claims, 7 Drawing Figures

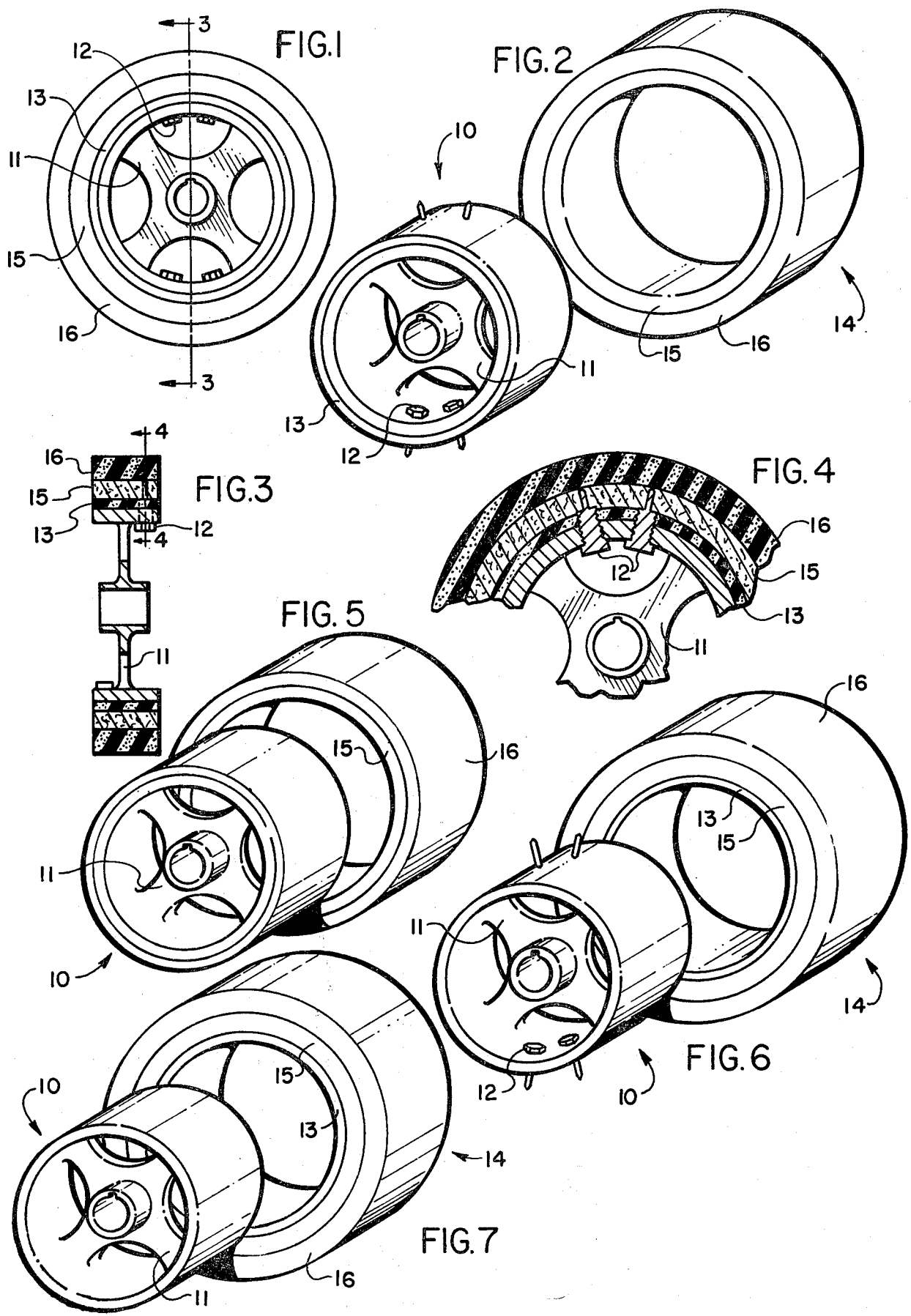

ROLLER WITH REPLACEABLE SLEEVE

BACKGROUND OF THE INVENTION

This invention relates generally to rollers and more particularly to rollers which are used to apply a surface coating to a can and to rollers used in graphics, embossing, laminating and spreading. Prior to the present invention, an economical and practical quick-change or replaceable roller to achieve these functions is not believed to have existed.

Heretofore, users of rubber-covered rollers in varied processing operations found that it was necessary to remove a damaged or worn-out roller from the shaft of a manufacturing machine and send it to a remote location for re-covering. This process was time consuming and expensive as the old roller typically had to be re-covered and then the surface thereof ground down so as to provide a suitable outer surface. Furthermore, the necessity to remove the entire roller required that an inventory of the large and heavy rollers (e.g. 6-24 inches in diameter; $20 \geq 140$ pounds in weight) be maintained so as to minimize the substantial down time in the manufacturing process.

Attempts have previously been made to solve these problems by providing a covered roller with a removable sleeve, as typified by U.S. Pat. No. 3,771,206 to Brown, but these attempts are understood to be both commercially and operationally unsuccessful. As in Brown, which discloses a roller utilizing a metal core having a removable outer sleeve secured thereto by both lugs with corresponding notches and clamp means, the removable sleeve and the metal core do not maintain a concentric relationship to each other since the sleeve does not maintain full peripheral contact with the metal core when in use and is less satisfactory in performance than expensive conventional covered rollers due to this lack of concentricity. Furthermore, the Brown patent discloses that the cardboard tube of the removable sleeve is placed on a mandrel where the elastomer is cast thereon and finish ground prior to removal from the mandrel. This is a relatively expensive operation and is not required to be performed on the readily replaceable sleeve of the roller of the present invention.

SUMMARY OF THE INVENTION

The roller of the present invention makes it possible to remove and replace a worn out sleeve while the core of the roller remains secured to a shaft of a manufacturing machine. This is accomplished by providing a roller having a readily replaceable sleeve. The roller comprises a core fabricated from a suitable material, such as metal, and having a layer of a suitable elastomer, such as rubber or urethane, fixedly secured to the outer peripheral surface of the core. The removable sleeve is adapted so as to longitudinally slide onto the core and frictionally engage and rotate with the core. The removable sleeve comprises a rigid inner layer of a suitable material, such as paper fiber or cardboard, and an outer surface layer of a suitable elastomer, such as rubber or urethane, fixedly secured to the inner layer. The outer surface layer of elastomer may be injection molded at a remote location and then secured to the rigid inner layer by any suitable means, such as adhesive, so as to provide a relatively inexpensive and replaceable sleeve.

It is to be understood that locking means may be utilized for further securing the removable sleeve to the core. The locking means may comprise at least one pointed steel locking nut, which when two or more are utilized, are ideally positioned in spaced-apart, diametrically opposed relationship and die-tapped into the core in such a manner so as to extend radially outwardly through the core with the point thereof extending into the rigid inner layer of the removable sleeve.

Therefore, when it is desired to remove a damaged or worn sleeve from a roller, it is only necessary to unscrew the pointed steel locking nuts to a position where their point is withdrawn from the rigid inner layer of the removable sleeve, and then to longitudinally slide the removable sleeve from the core. Once this is accomplished, a fresh removable sleeve can be longitudinally slid onto the core and the pointed steel locking nuts thereof screwed back into their operative position. To replace the sleeve of a roller requires little effort or time and consequently results in substantial financial savings to a manufacturer due in part to reduced inventory costs and to reduced overhead costs formerly associated with having a worn roller shipped to a distant location to be re-covered.

With the foregoing in mind, it is a main object of the present invention to provide a roller with a readily replaceable outer surface sleeve which can be quickly and easily replaced, when damaged or worn, by a like sleeve while the original hub of the roller remains secured to the shaft of the manufacturing apparatus.

Another object of the present invention is to provide a roller having a readily replaceable sleeve, which roller is both less expensive to manufacture and to maintain than covered rollers currently known to be used in many manufacturing processes.

A still more specific object of the present invention is to provide a roller having a readily replaceable sleeve, the roller comprising an elastomeric, peripheral surface layer on the core which, in cooperation with the removable sleeve, maintains a substantially concentric relationship between the core and the removable sleeve of said roller so as to enable the roller to be successfully used in graphics, coating, embossing, laminating and related processes where heretofore an integral covered roller has been used.

BRIEF DESCRIPTION OF THE DRAWINGS

FIG. 1 is an end view of the roller of the present invention;

FIG. 2 is a perspective view of the roller embodying the features of this invention;

FIG. 3 is a longitudinal section taken substantially on the line 3—3 of FIG. 1;

FIG. 4 is a fragmentary cross-sectional view taken substantially on line 4—4 of FIG. 3;

FIG. 5 is a perspective view illustrating a second exemplary embodiment of the roller of the present invention;

FIG. 6 is a perspective view illustrating a third exemplary embodiment of the roller of the present invention; and FIG. 7 is a perspective view illustrating a fourth exemplary embodiment of the roller of the present invention.

DESCRIPTION OF ILLUSTRATED PREFERRED EMBODIMENTS OF THE INVENTION

Reference is now made to FIGS. 1 and 2 of the drawings which illustrate one exemplary embodiment of the roller with a readily replaceable sleeve. The roller is particularly adapted for coating, such as the peripheral surface of a can in a can manufacturing process, and for use in graphics, embossing, laminating and other related processes, and the roller comprises a core, generally designated as 10, comprising a hub 11 which may be constructed of a suitable material such as aluminum, steel, plastic or wood and may be in the shape of a cylindrical, wheel-like member.

An elastomeric layer 13, constructed of a suitable elastomer such as rubber or urethane, is secured to the outer peripheral surface of the hub 11 of the core 10 in any well known manner, including "cold" processing, heat processing, mechanical bonding, or using an adhesive or an instant chemical bond formed by mixing a curing agent and the polymer together.

The core 10 has one or more pointed steel locking nuts 12 die-tapped into the hub 11 so as to extend radially outwardly therefrom. Slidably mounted on the core 10 is a removable sleeve, generally designated at 14. The removable sleeve 14 comprises a substantially rigid inner layer 15, constructed of a suitable material such as paper fiber, and having an outer surface layer 16 of a suitable elastomer, such as rubber or urethane, fixedly secured to the rigid inner layer 15. The outer surface layer 16 may be injection molded and then fitted over the inner layer 15 and secured thereto by adhesive or other suitable means. The outer surface of the rigid inner layer 15 may be "dimpled" or "roughed up" so as to facilitate the securement thereto by the outer surface layer 16. Thereafter, the outer surface layer 16, as needed, may be slightly finish ground in a well-known manner so as to prepare the roller for use in can coating, graphics and other related processes.

The outer layer 13 of the core 10, as noted hereinbefore, is permanently bonded to the hub 11 and is comprised of an elastomer such as rubber, urethane, or any cross-link compound which has sufficient rebound and physical properties to maintain a full concentric snug fit to the inside diameter of the rigid inner layer 15 of the removable sleeve 14 fitted over the outer layer 13. The full concentric snug fit between the outer layer 13 of the core with the rigid inner layer 15 of the removable sleeve is essential to the proper functioning of the roller of the present invention.

Whereas other known removable sleeves are slipped onto a bare metal core and secured by various means thereto, which do not maintain the concentricity therebetween, the roller of the present invention, through the use of the outer elastomer layer 13, enables the core 10 and the removable sleeve 14 to maintain a consistently concentric relationship. The layer of elastomer material 13, having a typical durometer reading of 35 degrees A scale, remains permanently bonded to the hub 11, and layer 13 acts to fill any voids that would otherwise develop between the core 10 and removable sleeve 14. The outer elastomer layer 13 is compressed when the removable sleeve is secured to the core and then tends to expand so as to prevent or compensate for any deformation of the removable sleeve 14. This filling action works as a compressive force between the outer layer 13 of the core and the rigid inner layer 15 of the removable sleeve so as to maintain the concentric relationship of the core 10 and the removable sleeve 14. If the removable sleeve 14 were to lose its relative concentricity with the core 10, the surface of the roller would tend to "skip" or lose its uniform rolling surface contact with a product being acted upon.

As can be best seen in FIGS. 3 and 4, the core and the removable sleeve may be secured against relative rotational and longitudinal movement by a locking means comprised of the pointed steel locking nuts 12. The locking nuts 12 are die-tapped into the hub 11 and extend generally radially outwardly through the hub 11 and outer layer 13 with the points thereof extending into the rigid inner layer 15 of the removable sleeve. Furthermore, the rigid inner layer 15 of the removable sleeve must allow penetration of the pointed steel locking nut 12 and still not separate when running at high speeds. When it is desired to remove the sleeve and replace it with a like sleeve, the pointed steel locking nut 12 is simply partially unscrewed so as to remove the point thereof from the rigid inner layer 15 of the removable sleeve. Then the removable sleeve is longitudinally slid off the core and replaced with a like sleeve.

Referring again to FIGS. 1 and 2, it is contemplated that when a plurality of the pointed steel locking nuts 12 are utilized, as opposed to a singular nut, they will be disposed in spaced-apart, diametrically opposed positions around the perimeter of the core 11. Such placement allows for a more uniform engagement of the removable sleeve 14 by the core 10 and resultant better functioning thereof.

A more detailed description of a typical roller contemplated by the present invention is set hereinbelow:
  Roller Diameter: 24 inches
  Roller Weight: 140 pounds
  Composition of Hub of Core: Steel
  Core Covering: Estane 58109 (urethane)
  Hardness of Core Covering: 90 durometer reading (A scale)
  Weight of Removable Sleeve: 6 pounds
  Composition of Rigid Inner Layer of Removable Sleeve: ½ inch thick cardboard or paper fiber preferably having a knurled or dimpled outer surface
  Composition of Outer Layer of Removable Sleeve: ¼–½ inch thick urethane
  Hardness of Outer Layer of Removable Sleeve: 16–35 durometer reading (D scale)
  End Use of Roller: Coating surface area of metal can with shellac prior to printing or painting process A second embodiment of the roller of the present invention is shown in FIG. 5 of the drawings. As can be clearly seen, the coating roller is comprised of the core 10 and the removable sleeve 14 but does not include a pointed steel locking nut 12 to engage the same against relative rotational or longitudinal movement. In this embodiment of the present invention, the frictional force between the elastomer outer layer 13 of the core and the rigid inner layer 15 of the removable sleeve 14 is sufficient to prevent relative longitudinal or rotational movement between the core 11 and the sleeve 14. The embodiment of the invention would typically be used in relatively smaller diameter rollers which would typically be operated at a relatively reduced rotational speed. It is understood that in this end use the additional securing means are not necessary between the core 11 and the removable sleeve 14 to assist in preventing relative movement.

Further embodiments of the roller of the present invention, as best shown in FIGS. 6 and 7, contemplate that the core 10 of the roller is not covered by the outer elastomeric surface layer 13. Instead, this layer 13 resides within the removable sleeve 14 as the innermost layer thereof for engaging the core 10 when slid thereon. This embodiment can be constructed either with or without the pointed steel locking nuts 12, depending on the end use therefor. (See FIGS. 6 and 7).

It will thus be seen that there is provided a roller having a readily removable sleeve for economical use in conjunction with many types of apparatus, such as can coating machines having one or more rollers each secured to a rotating shaft so as to apply a chemical coating to a can being processed. The coating which the roller applies to the surface of the product may be from a bath in which the roller resides or from a reservoir having a conduit which conducts the coating material to the surface of the roller.

In the drawings and specification, there have been set forth preferred embodiments of the invention and, although specific terms are employed, they are used in a generic and descriptive sense only and not for purposes of limitation, the scope of the invention being defined in the claims.

I claim:

1. A roller having a readily replaceable sleeve, comprising:

A cylindrical metal roller having a layer of rubber-like material fixedly secured to the outer peripheral surface thereof;

A cylindrical removable sleeve adapted to longitudinally slide onto said metal roller and maintain a concentric relationship therewith, said removable sleeve comprising an inner paper fiber sleeve for slidably receiving said metal roller and frictionally engaging the outer peripheral surface thereof so as to rotate with said metal roller, and a surface coating sleeve of a rubber-like material fixedly secured to the outer surface of said paper fiber sleeve; and A pointed steel locking nut, said locking nut being die-tapped into said metal roller and extending radially outwardly therefrom through said metal roller and the peripheral surface layer thereof, and with the point of said locking nut extending into the inner paper fiber sleeve of said removable sleeve so as to assist in preventing relative rotational and longitudinal movement between said metal roller and said removable sleeve.

2. A roller as claimed in claim 1, wherein a plurality of said pointed steel locking nuts are positioned in spaced-apart, diametrically opposing relationship around the periphery of said metal roller and extend radially outwardly therefrom to secure said removable sleeve thereto.

3. A roller as claimed in claim 1, wherein the rubber-like outer layer of said metal roller is comprised of material having a sufficient compressive force to maintain said removable sleeve and said metal roller in a concentric relationship so as to facilitate the operation of the roller.

* * * * *

UNITED STATES PATENT AND TRADEMARK OFFICE
CERTIFICATE OF CORRECTION

PATENT NO. : 4,178,664

DATED : December 18, 1979

INVENTOR(S) : Nelson E. McLoughlin

It is certified that error appears in the above—identified patent and that said Letters Patent are hereby corrected as shown below:

Column 1, Line 22, "$\geqq$" should be -- - --;

Column 4, Line 28, "11" should be --10--;

Column 4, Line 62, "11" should be --10--;

Column 4, Line 68, "11" should be --10--.

Signed and Sealed this

Eighth Day of April 1980

[SEAL]

Attest:

Attesting Officer

SIDNEY A. DIAMOND

Commissioner of Patents and Trademarks